United States Patent [19]

Schiller et al.

[11] 4,385,998

[45] May 31, 1983

[54] REMOVAL OF SUSPENDED SOLIDS FROM WATER

[75] Inventors: Joseph E. Schiller; Sanaa E. Khalafalla, both of Minneapolis, Minn.

[73] Assignee: The United States of America as represented by the Secretary of the Interior, Washington, D.C.

[21] Appl. No.: 293,027

[22] Filed: Aug. 14, 1981

[51] Int. Cl.³ .............................................. B01D 23/10
[52] U.S. Cl. ................................... 210/807; 210/907; 210/500.1
[58] Field of Search ..................... 210/807, 907, 500.1, 210/503, 504, 505, 792–796

[56] References Cited

U.S. PATENT DOCUMENTS

| | | | |
|---|---|---|---|
| 1,686,558 | 10/1928 | Hall | 210/807 |
| 2,964,189 | 12/1960 | Mooney | 210/807 |
| 3,418,237 | 12/1968 | Booth | 210/907 |
| 3,680,698 | 8/1972 | Liu | 210/907 |
| 3,992,282 | 11/1976 | Grosball | 210/807 |
| 4,181,607 | 1/1980 | Schiller | 210/807 |

Primary Examiner—Ernest G. Therkorn
Attorney, Agent, or Firm—William S. Brown; Donald A. Gardiner

[57] ABSTRACT

Nonfibrous suspended solids, such as quartz, clays and phosphate slime solids, are removed from water by filtration through a bed of MgO.

2 Claims, No Drawings

REMOVAL OF SUSPENDED SOLIDS FROM WATER

U.S. Pat. No. 4,181,607 to Joseph E. Schiller and Sanaa E. Khalafalla, applicants in the present application, discloses and claims the use of magnesium oxide for removal of asbestos fibers from water. These fibers are characterized by aspect ratios, i.e., ratios of fiber length to fiber diameter, of more than 5, usually at least 10, and their attachment to MgO particles was believed due to crystal lattice energies associated with such structures. It has, however, now been surprisingly found that nonfibrous solid materials such as quartz, clays, e.g., kaolin or bentonite, phosphate slime solids, solids from iron ore processing and granite quarrying, gold mine water solids, and steel mill solids, suspended particles of which generally have aspect ratios of essentially unity, may also be efficiently removed from water by filtration through granular MgO of suitable particle size and bed depth. Efficiency of the MgO in removal of suspended solid materials from water has been found to be significantly superior to conventional filter materials such as sand.

Conventional filtration procedures may be used in the process of the invention, with percolation of the feed through a bed of the MgO in a column of suitable dimensions generally being most convenient and efficient. Optimum values of parameters such as grain size and bed depth of the MgO, dimensions of the column, flow rates, and desired degree of removal of solids are all interdependent, as well as being dependent on the nature of the feed, and are best determined experimentally. Generally, however, MgO grain sizes of about 10 to 100 mesh, preferably about 20 to 50 mesh, with bed depths of about 1 to 3 feet and flow rates of about 2 to 4 gal/min/ft$_2$ of filter give good results.

Although the MgO filter bed alone is generally very efficient, giving solids removals of 80 to near-100 percent depending on flow rates, it may in some cases be desirable to combine MgO beds with other filter materials such as sand, as illustrated in the examples below. In addition, treatment of the feed with conventional coagulants, such as alum, ferric oxide or polymeric compounds, prior to filtration may sometimes be desirable. The MgO filters of the invention may also be readily regenerated by ordinary backwashing, i.e., by pumping water backwards through the filter.

The process of the invention will be more specifically illustrated by the following examples.

EXAMPLE 1

Sand that had been pulverized and screened to $-400$ mesh was dispersed in water to give a suspension with 20 mg/l of sand and a turbidity of 3.6 NTU. This mixture was filtered through a filter with a 6 inch deep layer of 20/30 mesh MgO and a 12 inch deep layer of 30/50 mesh MgO. The flow rate corresponded to 8 gallons per minute for each square foot of filter area. After ½ hour and 2 hours from the beginning of the test, the turbidity of the water was 0.4 NTU and 0.57 NTU, respectively.

EXAMPLE 2

Kaolin was dispersed with water to give a suspension of 10 mg/l suspended solids and a turbidity of 6.3 NTU. The mixture was filtered at a flow rate of 7.5 gpm/ft$^2$ through a filter consisting of 6 inches of 20/30 mesh MgO, 6 inches of 50/70 mesh MgO, and 4 inches of 70/100 mesh MgO. Throughout the 2 hours of the test, the turbidity remained below 0.06 NTU.

EXAMPLE 3

Phosphate slime was diluted with water to give a mixture containing 27 mg/l of suspended solids. Phosphate slime solids consist of very fine quartz, various clays, silicate minerals, and phosphate minerals. The 27 mg/l suspension was filtered through a 10 inch deep layer of 50/70 mesh MgO at a rate of 6.4 gpm/ft$^2$. After about 1 hour from the beginning of the test, the turbidity of the filtrate was 20 percent of the original, and after an additional 2 hours, the turbidity was 30 percent of the original.

EXAMPLE 4

A suspension of fine quartz (7 ppm) was filtered in an 8 inch diameter filter through a bed of 18 inches of 20/30 mesh sand or 18 inches of 20/30 mesh MgO. Alum was added at a rate of 2.5 mg/l to the water prior to filtration and the flow as 2.3 gpm. After 7 hours, the filtrate turbidity was 0.46 NTU for sand and 0.20 NTU for the MgO filter. The pressure drop across the filter increased from 1.1 psi to 2.5 psi for sand, but the pressure increase for MgO was only from 0.75 psi to 0.95 psi.

EXAMPLE 5

A suspension of kaolin (5 ppm) was filtered in an 8 inch diameter filter through a bed of 18 inches of 20/30 mesh sand or 18 inches of 20/30 mesh MgO. Alum was added at a rate of 5 mg/l to the water prior to filtration and the flow was 2.3 gpm. After 7 hours, the filtrate turbidity was 0.47 NTU for sand and 0.15 NTU for the MgO filter. The pressure drop across the filter increased from 1.1 psi to 2.2 psi for sand, but the pressure increase for MgO was only from 0.9 psi to 1.2 psi.

EXAMPLE 6

A suspension of kaolin (25 ppm) was filtered in a 1 -inch diameter filter containing 6 inches of 20/30 mesh silica sand and 12 inches of 30/50 mesh garnet sand or 6 inches of 20/30 mesh silica sand and 12 inches of 30/50 mesh MgO. Alum was added at 10 mg/l to the water prior to filtration. For the silica sand-garnet sand filter, the filtrate turbidities after 1, 4, and 6 hours were 0.31, 0.40, and 0.96 NTU, respectively. For the silica sand-MgO filter, the filtrate turbidities after 1, 4, and 6 hours were 0.27, 0.19, and 0.25 NTU, respectively. The increase in pressure drop across the silica sand-garnet sand was from 0.75 to 2.1 psi, and the increase for the silica sand-MgO filter was 0.75 to 1.6 psi.

EXAMPLE 7

Process water from an iron mine-pelletizing plant had an initial turbidity of 46 NTU. The water was filtered through either 6 inches of 10/20 mesh anthracite coal and 6 inches of 30/50 mesh garnet sand or 6 inches of 10/20 mesh anthracite coal and 6 inches of 30/50 mesh MgO. Alum was added at 15 mg/l to the water prior to filtration. For the anthracite coal-garnet sand filter, turbidities after 1, 3, 4, and 5 hours were 0.08, 0.09, 5.2 and 11.9 NTU, respectively, while the anthracite coal-MgO filtrate turbidities at the same time were 0.11, 0.15, 0.19 and 0.17 NTU. Even after 7 hours, the anthracite coal-MgO filtrate turbidity was below 0.22 NTU.

We claim:

1. A process for treatment of a feed consisting essentially of water and, suspended therein, a solid material from the group consisting of quartz, clay, phosphate slime solids, solids from iron ore processing, solids from granite quarrying, gold mine water solids, steel mill solids, or mixtures thereof, comprising filtering the feed through a layer of magnesium oxide.

2. The process of claim 1 in which the filtration is accomplished by percolation of the feed through a bed of the magnesium oxide in a column.

* * * * *